United States Patent
Wayman

(10) Patent No.: US 7,331,437 B2
(45) Date of Patent: Feb. 19, 2008

(54) FRICTION CLUTCH ASSEMBLY HAVING A SPIRAL SNAP RING FRICTION LINER RETENTION DEVICE

(75) Inventor: Nathaniel Eric Wayman, Cadillac, MI (US)

(73) Assignee: BorgWarner Inc., Auburn Hills, MI (US)

( * ) Notice: Subject to any disclaimer, the term of this patent is extended or adjusted under 35 U.S.C. 154(b) by 284 days.

(21) Appl. No.: 11/193,699

(22) Filed: Jul. 29, 2005

(65) Prior Publication Data

US 2007/0023253 A1 Feb. 1, 2007

(51) Int. Cl.
*F16D 13/30* (2006.01)
*F16D 13/68* (2006.01)

(52) U.S. Cl. ............... 192/66.22; 123/41.12; 192/91 A

(58) Field of Classification Search ............. 192/66.22, 192/66.23; 411/517; 403/202, DIG. 7
See application file for complete search history.

(56) References Cited

U.S. PATENT DOCUMENTS

| | | | |
|---|---|---|---|
| 2,185,538 A | * | 1/1940 | Burtnett ...................... 475/208 |
| 2,840,316 A | * | 6/1958 | Herbenar .................. 192/82 T |
| RE29,601 E | | 4/1978 | Richards |
| RE31,296 E | | 7/1983 | Richards |
| 5,411,122 A | | 5/1995 | Uphaus |
| 5,584,776 A | | 12/1996 | Weilant et al. |
| 6,577,033 B1 | | 6/2003 | Sekine |
| 6,837,821 B2 | | 1/2005 | Teraoka et al. |

* cited by examiner

*Primary Examiner*—Rodney H. Bonck

(57) ABSTRACT

A friction clutch assembly for use in an on/off fan drive is provided having a simplified method for retention of the friction liner between the clutch housing and rotating drive shaft. The friction clutch assembly introduces a groove within the inner rearward portion of the clutch housing. A spiral snap ring is installed into the groove to retain the friction liner between the clutch housing and rotating drive shaft. The spiral snap ring functions to axially retain the friction liner between the clutch housing and rotating drive shaft during use.

12 Claims, 2 Drawing Sheets

FRICTION CLUTCH ASSEMBLY HAVING A SPIRAL SNAP RING FRICTION LINER RETENTION DEVICE

TECHNICAL FIELD

The present invention relates generally to friction clutch assembly and more particularly to a friction clutch assembly having a spiral snap ring friction liner retention device.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places a non-required draw on the engine and thereby reduces efficiency. To compensate for this, present fan assemblies utilize fan clutch assemblies that allow for the selective engagement of the fan to the engine such that the fans are engaged only when necessary.

The present invention relates to friction coupling devices that drive radiator-cooling fans. A common friction-coupling device is that of the dry friction drive style, otherwise referred to interchangeably hereinafter with a friction clutch assembly. Dry friction drives are used for their simplicity, cool operating temperature, and ability to turn at fully engaged peak operating speeds.

Although the present invention may be used advantageously in various configurations and applications, it is especially advantageous in a coupling device of the type used to drive a radiator cooling fan of an internal combustion engine for an over-the-road truck, such as a class 8 truck, and will be described in connection therewith.

Dry friction drives tend to have two operating conditions "ON and OFF", which refers to when an associated friction clutch is either fully engaged or fully disengaged. When a friction clutch assembly is fully engaged, the assembly provides cooling to an associated engine and is not slipping. When a friction clutch assembly is fully disengaged slippage between the clutch plate and an engagement surface is at a maximum, thus providing little rotational output to drive an associated fan.

In order to engage the fan drive, a friction liner is typically mounted between the clutch housing and rotating driveshaft utilizing a series of stamped plates and screws. These plates and screws add to the overall cost of the clutch systems both in terms of part count and in terms of manufacturing assembly steps.

It would therefore be highly desirable to find a more cost effective method for axial retaining the friction liner between the clutch housing and rotating shaft.

SUMMARY OF THE INVENTION

A friction clutch assembly is provided having a simplified method for retention of the friction liner between the clutch housing and rotating drive shaft.

The friction clutch assembly introduces a groove within the inner rearward portion of the clutch housing. A spiral snap ring is installed into the groove to retain the friction liner between the clutch housing and rotating drive shaft. The spiral snap ring functions to axially retain the friction liner between the clutch housing and rotating drive shaft during use. The spiral snap ring is easy to install and uninstall, which allows for relatively easy assembly and disassembly. Further, spiral snap rings replaces costly stamped plates, tapped holes and retaining screws used to retain the friction liner according to the prior art which allows for cost savings in terms of reduced part count and assembly.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
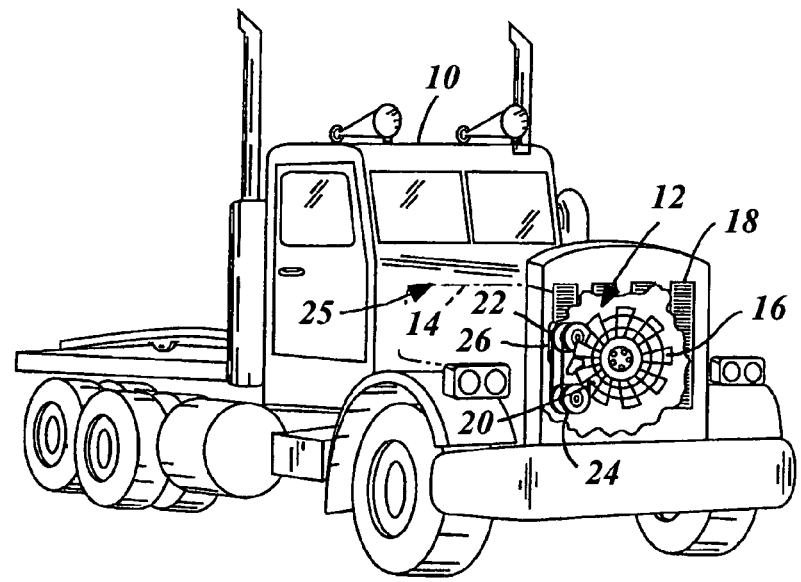
FIG. 1 is a perspective view of a vehicle utilizing a friction clutch assembly in accordance with an embodiment of the present invention.

In the following figures the same reference numerals will be used to refer to the same components. While the present invention is described primarily with respect to a cone clutch fan drive system, the present invention may be adapted and applied to various systems including: hydraulic systems, electrical systems, pneudraulic systems, mechanical systems, pneumatic systems, vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 at an increased ratio to turn a radiator-cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
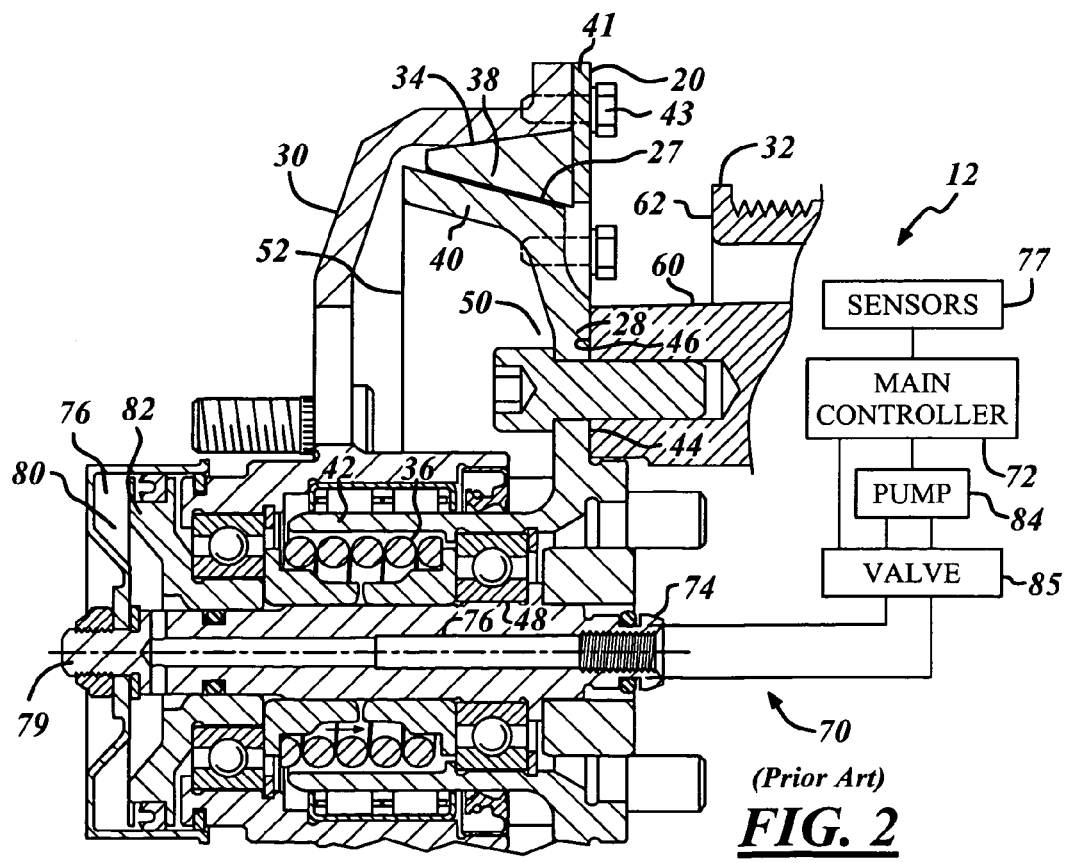
FIG. 2 is a quarter side cross-sectional view of a friction clutch assembly in accordance with an embodiment of the prior art.
Figure 3:
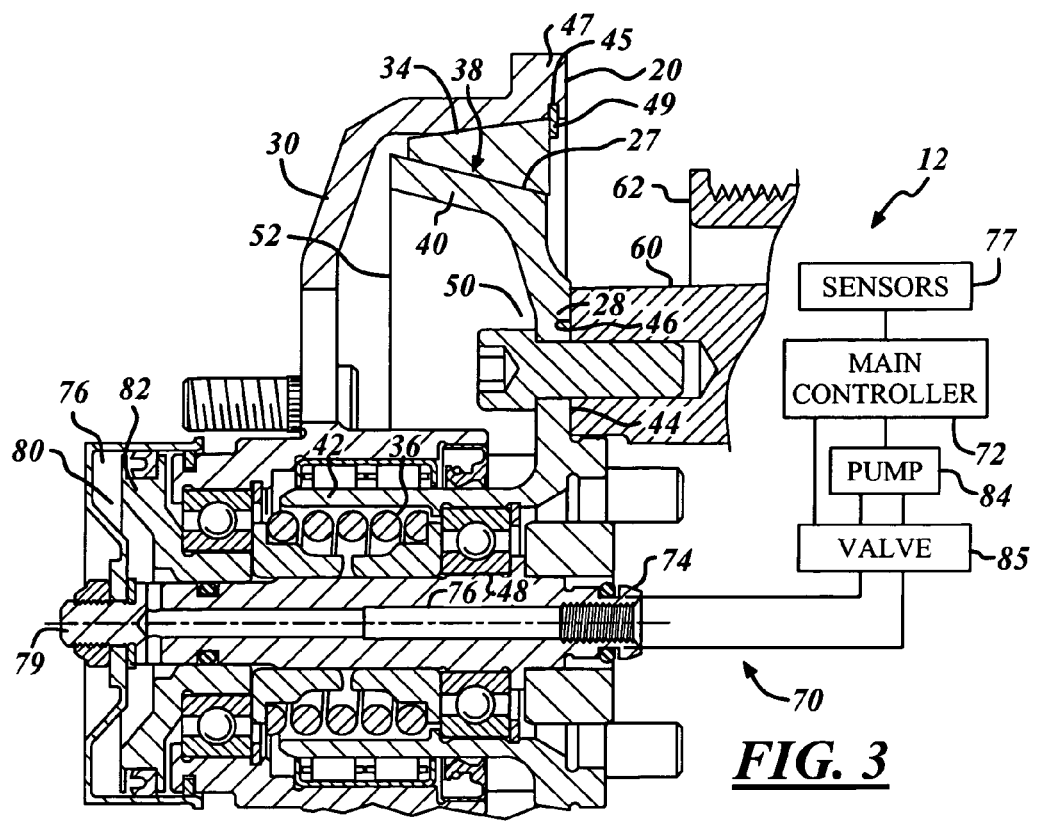
FIG. 3 is an illustration of cone clutch fan drive in accordance with the present invention in a clutch engaged position.
Figure 4:
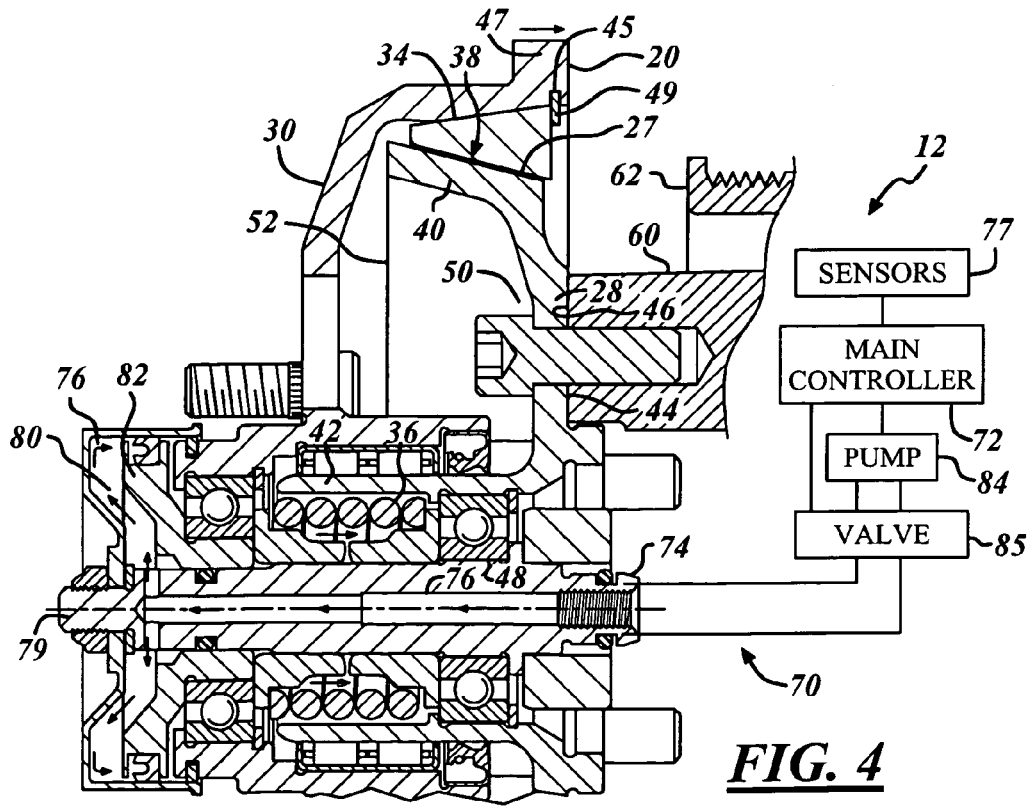
FIG. 4 is an illustration of cone clutch fan drive in accordance with the present invention in the clutch-disengaged position.

Referring now to FIG. 2-4, a quarter side cross-sectional view of the friction clutch assembly 20 having a rotating shaft 27 with a thermal energy transfer portion 28 in an engaged position accordance with an embodiment of the prior art (FIG. 2) and according the a preferred embodiment of the present invention in both the engaged (FIG. 3) and disengaged position (FIG. 4).

The assembly 20 includes a translatable clutch housing 30 and a drive shaft 27. The clutch housing 30 is attached to an engine-cooling fan, such as fan 16. The drive shaft 27 is coupled to a drive pulley 32 within the transfer portion 28. Thus, the rotation of the drive pulley will cause rotation of the drive shaft at a given engine speed.

As shown in FIG. 2, a friction liner 34 is coupled to the clutch housing 30 using a series of stamped plates 41 and screws 43 (the cross section shows one plate 41 and a pair of screws 43) and is axially retained between the clutch housing 30 and the rotating shaft 27.

Conversely, in a preferred embodiment as shown in FIGS. 3 and 4, a simplified method for coupling the friction liner 34 within the clutch housing 30 and rotating shaft 27 is presented that eliminates the use of the series of stamped plates 41 and screws 43. In this preferred embodiment, shown in the engaged (FIG. 3) and disengaged state (FIG. 4), the clutch housing 30 includes a groove 45 along its inner rearward end 47. A flexible retention device 49, preferably a spiral snap ring 49, is inserted within the groove 45 to retain the friction liner 34 within the clutch housing 30 such that it resides between the clutch housing 30 and the rotating shaft 27. The flexible retention mechanism 49 provides axial retention of the friction liner 34 in both the engaged and disengaged state.

A clutch spring 36 engages the clutch housing 30 with the rotating shaft 27 in a friction clutch engagement area 38. In operation, the drive pulley 32 rotates in turn rotating the shaft 27, which when engaged to the friction liner 34 rotates the housing 30. The rotation of the clutch housing 30 is translated to a coupled radiator-cooling fan 16 to provide airflow through a radiator 18.

During engagement of the housing 30 by the shaft 27 through the friction liner 34, thermal energy is generated by the contact between the friction liner 34 and the shaft 27 in the engagement area 38, and a certain amount of the thermal energy is transferred through the transfer portion 28 into the drive pulley 32.

The shaft 27 has the transfer portion 28, as well as a friction contact portion 40 and a spring/bearing portion 42. The transfer portion 28 is generally vertical in orientation, whereas the friction contact portion 40 and the spring/bearing portion 42 are generally horizontal in orientation. The spring/bearing portion 42 is coupled to a shaft 79 by bearings 48. The transfer portion 28 has a pulley contact surface 44 that corresponds with a shaft contact surface 46 on the pulley 32.

The pulley 32 includes a center protruding portion 60 and a pulley portion 62. The center portion 60 extends forward away from the pulley portion 62 and is in contact with the shaft 27. The center portion 60 includes the shaft contact surface 46 and is coupled to the shaft 27. The pulley 32 may be coupled directly to the shaft 27 or indirectly via one or more thermal energy transfer coupling elements (not shown). The thermal energy transfer coupling elements may be used to further absorb thermal energy from the shaft 27. The pulley 32 and the thermal energy transfer coupling elements perform as heat sinks and as such may be formed of various thermal energy conductive or heat sink materials known in the art. The pulley 32 and the thermal energy transfer coupling elements may, for example, be formed of steel, aluminum, copper, or a combination thereof.

The friction clutch assembly 20 also includes a fluidic control circuit 70 that is operated via a main controller 72. The fluidic control circuit 70 includes a piston rod or pneumatic transfer conduit 74 with a fluid channel 76 residing therein for the transfer of fluid, such as air, into a piston reservoir 78 of a fluid cylinder 80. The fluid cylinder 80 resides over a piston 82. A fluid pump 84 and a corresponding valve 85 are fluidically coupled to the fluid channel 76. The main controller 72 is coupled to the pump 84 and to the valve 85 and adjusts the flow of the fluid into and out of the reservoir 78. The valve 85 may, for example, be in the form of a solenoid.

The main controller 72 may be contained within the system 12 or may be separate from the system 12 as shown. The main controller 72 may be microprocessor based such as a computer having a central processing unit, memory (RAM and/or ROM), and associated input and output buses. The main controller 72 may be a portion of a central vehicle main control unit, an interactive vehicle dynamics module, a cooling system controller, or may be a stand-alone controller as shown. The main controller 72 may be coupled to a plurality of sensors 77 located throughout the engine that give inputs regarding particular engine operating conditions. The main controller 72 interprets these signals to adjust the flow of fluid into and out of the fluid reservoir 76, therein precisely controlling the engagement or disengagement of the friction clutch assembly and therein precisely controlling the engine operating temperature to achieve a desired balance of engine performance characteristics such as fuel economy and emission.

The friction clutch assembly 20 is frequently engaged, as shown in FIG. 3. When engaged no fluid is pumped into the reservoir 76. The piston 82 and thus the housing 30 are in a fully engaged position. In the engaged position the spring 36 is decompressed or in an expanded state.

When cooling is no longer desired the main controller 72 pumps fluid into the reservoir 76, which causes the piston 82 to shift rearward, towards the shaft 27. As the piston 82 shifts rearward (rightward in FIG. 4), the housing 30 also shifts rearward, thereby, compressing the spring 36 and causing the friction liner 34 and thus the housing 30 to disengage with the shaft 27. This is the so-called disengaged position as shown in FIG. 4.

Of course, in other preferred embodiments, the engagement and disengagement mechanism of a preferred embodiment of the present invention may be reversed, wherein the clutch mechanism is maintained in a disengaged state in the absence of activation from the main controller and still fall within the spirit of the present invention.

The present invention offers a simplified approach for coupling the friction liner 34 between the housing 30 and the rotating shaft 27. By eliminating the use of the stamped plates 41 and screws, cost savings are realized both in terms of reduced part count and in terms of reduced manufacturing assembly costs associated with attaching multiple stamped plates and screws. Further manufacturing costs savings are realized associated with the prior art process for introducing tapped holes within the housing.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An on/off friction clutch assembly for a fan drive system of an engine, the clutch assembly comprising:
    a translatable clutch housing coupled to a fan and having an inner groove;
    a drive shaft coupled to and rotatable with a drive pulley of the engine, said drive pulley rotating as a function of a given engine speed; and
    a friction liner residing between and engageable with said rotating drive shaft and said translatable clutch housing, said engagement thereof causing said translatable clutch portion to rotate when said friction liner is engaged with said drive shaft rotating at said given engine speed; and
    a flexible retention device coupled within said groove, said flexible retention device directly contacting said friction liner and retaining said friction liner between said translatable clutch housing and said rotating drive shaft.

2. The friction clutch assembly of claim 1, wherein said flexible retention device comprises a spiral snap ring.

3. The friction clutch assembly of claim 1 further comprising
    a fluidic control circuit coupled to said translatable clutch housing and capable of moving said translatable clutch housing between an engaged position and a disengaged position, said engaged position defined wherein said friction liner is fully engaged with said rotating drive shaft to rotate said translatable clutch housing as a function of a rotational rate of said drive shaft and wherein said disengaged position is defined wherein said friction liner is disengaged from said drive shaft and prevents rotation of said translatable clutch housing as a function of said rotational rate of said rotating drive shaft; and
    a main controller for controlling the relative location of said translatable clutch housing between said engaged and said disengaged position.

4. The friction clutch assembly of claim 3, wherein said fluidic control circuit comprises:
    a pneumatic transfer conduit coupled within said rotating drive shaft, said pneumatic transfer conduit including a piston coupled to a shaft having a fluid channel, said piston coupled with said translatable clutch housing;
    a fluid cylinder coupled to said pneumatic transfer circuit;
    a piston reservoir fluidically coupled to said fluid channel, said piston reservoir defined between said fluid cylinder and said piston;
    a clutch spring positioned between said shaft and said rotating drive shaft, said clutch spring biasing said piston and said translatable clutch housing into said engaged position with a clutch engagement force;
    a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch housing from said engaged position to said disengaged position;
    wherein said main controller controls said quantity of air within said reservoir.

5. The friction clutch assembly of claim 4 further comprising one or more sensors electrically coupled to said main controller, said one or more sensors sending an electronic signal to said main controller as a function of an engine operating condition.

6. A method for coupling a friction liner between a translatable clutch housing and a drive shaft on an on/off friction clutch system, the method comprising:
    introducing a groove within an inner portion of the translatable clutch housing;
    coupling the friction liner between an inner portion of the translatable clutch housing and the drive shaft; and
    introducing a flexible retention device within said groove such that said friction liner is axial retained within said inner portion, the drive shaft and the flexible retention device, said flexible retention device being in direct contact with said friction liner.

7. The method of claim 6, wherein introducing said flexible retention device comprises introducing a spiral snap ring within said groove such that said friction liner is axial retained within said inner portion, the drive shaft and the spiral snap ring.

8. An engine cooling system comprising:
    (a) an engine having a crankshaft rotating at a given engine speed;
    (b) a radiator coupled to said engine;
    (c) a drive pulley coupled to and rotating with said crankshaft;
    (d) a friction coupling assembly mounted to said engine, said friction clutch assembly comprising:
    a translatable clutch housing having an inner groove;
    a drive shaft coupled to and rotating with said drive pulley; and
    a friction liner residing between and engageable with said drive shaft and said translatable clutch housing, said engagement thereof causing said translatable clutch portion to rotate when said friction liner is engaged with said drive shaft rotating as a function of a rotational rate of said drive pulley; and
    a flexible retention device coupled within said groove, said flexible retention device in direct contact with said friction liner and retaining said friction liner between said clutch housing and said rotating drive shaft; and
    (e) a fan coupled to said translatable clutch system and capable of rotating with said translatable clutch system to provide cooling airflow to said radiator at said given engine speed.

9. The engine cooling system of claim 8, wherein said flexible retention device comprises a spiral snap ring.

10. The engine cooling system of claim 8, wherein said friction coupling assembly further comprising
    a fluidic control circuit coupled to said translatable clutch housing and capable of moving said translatable clutch housing between an engaged position and a disengaged position, said engaged position defined wherein said friction liner is fully engaged with said drive shaft to rotate said translatable clutch housing as a function of a rotational rate of said drive shaft at said given engine speed and wherein said disengaged position is defined wherein said friction liner is disengaged from said drive shaft and prevents rotation of said translatable clutch housing as a function of said rotational rate of said drive shaft at said given engine speed; and a main controller for controlling the relative location of said translatable clutch housing between said engaged position and said disengaged position.

11. The engine cooling system of claim 10, wherein said fluidic control circuit comprises:

a pneumatic transfer conduit coupled within said rotating drive shaft, said pneumatic transfer conduit including a piston coupled to a shaft having a fluid channel, said piston coupled with said translatable clutch housing;

a fluid cylinder coupled to said pneumatic transfer circuit;

a piston reservoir fluidically coupled to said fluid channel, said piston reservoir defined between said fluid cylinder and said piston;

a clutch spring positioned between said shaft and said drive shaft, said clutch spring biasing said piston and said translatable clutch housing into said engaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said engaged position to said disengaged position;

wherein said main controller controls said quantity of fluid within said reservoir.

12. The engine cooling system of claim 11, wherein said friction coupling assembly further comprises one or more sensors electrically coupled to said main controller, said one or more sensors sending an electronic signal to said main controller as a function of an engine operating condition.

* * * * *